United States Patent [19]
Villa et al.

[11] 3,986,996
[45] Oct. 19, 1976

[54] AQUEOUS SEALANT FROM ALKALI SILICATE, LIQUID POLYSULFIDE POLYMER AND COAL TAR

[75] Inventors: Jose L. Villa, Hightstown, N.J.; Stephen W. Osborn, Newtown, Pa.

[73] Assignee: Thiokol Corporation, Newtown, Pa.

[22] Filed: May 9, 1974

[21] Appl. No.: 468,562

Related U.S. Application Data

[63] Continuation of Ser. No. 250,320, May 4, 1972.

[52] U.S. Cl. .................. 260/28 R; 260/29.2 R; 260/29.2 M; 260/29.2 EP; 260/37 R
[51] Int. Cl.² .............. C08G 75/16; C08L 95/00; C08L 81/04
[58] Field of Search ............. 260/29.2 R, 79.1, 28

[56] References Cited
UNITED STATES PATENTS

| | | | |
|---|---|---|---|
| 2,012,347 | 8/1935 | Patrick | 260/29.2 R |
| 2,458,222 | 1/1949 | Talalay | 260/29.2 R |
| 2,466,963 | 4/1949 | Patrick et al. | 260/79.1 |
| 2,489,567 | 11/1949 | Ernster | 260/29.2 R |
| 3,240,736 | 3/1966 | Beckwith | 260/29.2 R |
| 3,297,622 | 1/1967 | Grosner et al. | 260/29.7 |
| 3,316,194 | 4/1967 | Payne et al. | 260/28 |
| 3,349,047 | 10/1967 | Sheard | 260/18 R |
| 3,536,562 | 10/1970 | Shipp et al. | 156/242 |
| 3,635,873 | 1/1972 | Bertozzi | 260/28 |
| 3,635,880 | 1/1972 | Lamboy et al. | 260/79.1 R |
| 3,770,678 | 11/1973 | Paul | 260/29.2 R |

*Primary Examiner*—Murray Tillman
*Assistant Examiner*—Arthur H. Koeckert

[57] ABSTRACT

Curable liquid polymers selected from mercaptan-terminated polysulfide polymers, polyepoxides and oganosilicon polymers are extended by mixing therewith, prior to curing 10% to 200% by weight, based on the weight of liquid polymer, of an aqueous colloidal dispersion selected from aqueous alkali metal silicates having an $M_2O:SiO_2$ ratio of 0:1 to 1:1 and aqueous magnesium oxide. Upon curing of the mixture to solid form, nearly all of the water of the aqueous dispersion remains bound in the solid cured material and little, if any, shrinkage occurs.

7 Claims, No Drawings

AQUEOUS SEALANT FROM ALKALI SILICATE, LIQUID POLYSULFIDE POLYMER AND COAL TAR

This is a continuation of application Ser. No. 250,320, filed May 4, 1972.

This invention relates to sealant, adhesive and coating compositions and especially to sealant formulations based on liquid polymers which are convertible by curing agents to rubbery form and which are useful in sealing cracks in and adhesively bonding cementitious materials used in the construction of roads, airfields, docks, canals, buildings and the like, and also in the adhesive bonding of substrates such as glass, aluminum and the like, as well as to a method of converting such sealants into rubber-like form. Still more particularly, the invention relates to a low cost extender for use in such compositions.

Numerous types of sealant formulations and coating compositions based on liquid organic polymers are known in the art for sealing joints in and bonding cementitious materials, glass and metals and for a variety of coating applications. The organic polymers of the sealant formulations are commonly of the curable type, i.e., they are convertible to rubbery form by chemical reaction with a curing agent. Typical sealant and coating formulations may be based, for example, on liquid polythiopolymercaptans, liquid polyepoxides and liquid organosilicon polymers. Representative sealant formulations based on liquid organic polymers are disclosed, for example, in U.S. Pat. Nos. 2,910,922; 3,225,017; 3,316,194; 3,349,047; 3,536,562; and 3,540,961.

In general, the liquid organic polymers on which such sealant and coating compositions are based are relatively expensive materials. It is evident that the cost of compositions based on such polymers can be reduced by incorporation therein of inexpensive diluents or extenders which reduce the proportion of the polymer required in the formulation. It is, of course, necessary that the extender be of such a character that it does not significantly reduce the sealing or coating effectiveness of the composition and that it be compatible with the polymer either in and of itself or in the presence of another ingredient of the composition. For example, in cases where a sealant is to be used to seal joints or cracks, the use of a volatile solvent as a diluent is unsatisfactory because evaporation of the solvent causes excessive shrinkage of the cured sealant bond. While particulate inert fillers such as calcium carbonate and silica have been used in such sealant compositions, the amount of such fillers that can be used without adversely affecting the physical properties of the resulting seal is limited.

It is accordingly an object of the present invention to provide a novel group of exceptionally inexpensive extenders which can be incorporated in sealant compositions of the type referred to above without having any substantial adverse effect on the adhesive and bonding properties of the seals formed therefrom. It is another object of the invention to provide a curable liquid sealant composition based on an organic polymer and containing a substantial proportion of an inexpensive extender which is compatible with or can be made compatible with the polymer on which the sealant is based. It is a still further object of the invention to provide a sealant, coating or adhesive composition based on a liquid curable organic polymer, which composition contains a large proportion of inexpensive extender that does not cause excessive shrinkage when the composition is cured. It is still another object of the invention to provide a process for converting a curable liquid polymer into solid form which comprises mixing with the polymer prior to curing a relatively large amount of a novel and inexpensive extender. Other objects of the invention will be in part obvious and in part pointed out hereafter.

The present invention is based on the discovery that certain aqueous colloidal dispersions or gels can be incorporated as extenders in sealant and coating compositions of the general type referred to above and that the resulting cured seals, joints and coatings exhibit little, if any, shrinkage, notwithstanding the fact that the added extenders contain a considerable proportion of water which would be expected to evaporate and cause substantial shrinkage of the seal or coating. It appears that when the aqueous extenders of the present invention are used, nearly all of the water associated with the extender is bound in some manner such that it becomes an integral part of the cured seal or coating. Thus the water content of the aqueous dispersion itself acts as an extender.

The present extenders comprise in general aqueous colloidal dispersions of certain inorganic oxides and oxide mixtures, in particular, aqueous magnesium oxide and aqueous alkali metal silicates, e.g., sodium potassium and lithium silicates, as well as aqueous dispersions of finely divided silica. Because of their low cost and ready availability, the aqueous sodium silicates are preferred. While the extenders are referred to herein as aqueous colloidal dispersions, it has been found that the liquid phase of the dispersion may contain, in addition to water, other liquids miscible with water such as, e.g., ethylene glycol, polyglycol and polyglycol ethers, and the phrase "aqueous dispersion" as used herein is intended to include such mixtures.

It has been found that the range of proportions of magnesium oxide in the dispersions made therefrom is desirably somewhat less than the proportion of silicates in the silicate dispersions. More particularly, the magnesium oxide dispersions preferably contain from about 5% to 40% by weight of magnesium oxide. The magnesium oxide used has a sufficiently fine particle size so that even when it is present in relatively small proportions, the dispersion has a pasty consistency.

In the case of the silicate and silica dispersions, the solids content is preferably from about 20% to 60% by weight of the colloidal dispersion. Silicates having various ratios of alkali metal oxide to silica ($M_2O:SiO_2$) may be used. Thus the ratio $M_2O:SiO_2$ may vary from 0:1 to 1:1, with the initial ratio indicating silica per se. The preferred ratio is from about 1:1 to 1:4.

As indicated above, the low cost extenders of the present invention may be usefully employed in curable sealant, adhesive and coating compositions based on various polymers such as the polysulfide, polyepoxide and silicone polymers. As is known in the art, liquid polysulfide polymers may be made by first preparing high molecular weight solid polymers and then splitting the solid polymers to form liquid polymers. The solid polymers may be prepared by reacting with alkali metal or alkaline earth metal sulfide solutions difunctional organic compounds, usually containing a small amount, say 1% to 4% of trifunctional compounds to provide cross-links, to produce high molecular weight polymers having the recurring unit (RSS) wherein R is a divalent organic radical that may vary widely in its specific structure and SS represents a disulfide linkage through which the organic radicals are interconnected. The polymers thus obtained are high molecular weight polymers characterized by exceptional resistance to acids, alkalis, petroleum hydrocarbons and atmospheric oxidation.

The liquid polysulfide polymers can be obtained from the high molecular weight polymers referred to above by a splitting process described in U.S. Pat. No. 2,466,963. As disclosed in the latter patent, the high molecular weight polymers can be split to form polythiopolymercaptan polymers having molecular weights of the order of 500 to 25,000 which are viscous liquids having viscosities in the range 300 to 100,000 centipoises at 25° C. Such liquid polymers can be cured by any of various curing agents disclosed in U.S. Pat. No. 2,466,963 to form solid elastomers having the exceptional resistance to solvents and atmospheric oxidation and moisture referred to above.

In the commercially important liquid polymers the R of the (RSS) groups is generally a hydrocarbon or oxahydrocarbon group, for example, a diethyl formal group to produce polymers essentially composed of the recurring

groups and having free mercapto terminals through which they may be cured to form a solid elastomer. Typical curing agents for such mercapto-terminated liquid polysulfide polymers include inorganic peroxides, particularly peroxides of lead, zinc, calcium, barium, sodium, lithium, manganese and antimony, as well as sodium carbonate peroxide. Organic peroxides such as benzoyl peroxide, dicumyl peroxide and cumene hydroperoxide may also be used. In order to achieve good dispersion of the curing agent in the liquid polymer, it is often desirable to use the curing agent in the form of a paste made by mixing the curing agent with a plasticizer such as a chlorinated aromatic or paraffinic hydrocarbon or an unsubstituted hydrocarbon such as poly-alpha-methylstyrene.

Sealant compositions based on such liquid polysulfide polymers are also known in the art and are disclosed, for example, in certain of the U.S. patents referred to above. Such sealant compositions commonly comprise in addition to the liquid polysulfide polymer and curing agent therefor various special purpose additives such as fillers, plasticizers, curing rate modifiers, adhesion promoters and the like.

In cases where the present extenders are used in sealants based on liquid polysulfide polymers, the sealant desirably contains an auxiliary resin material to improve the compatibility of the liquid polymer and the extender. Suitable resinous materials for this purpose include coal tar, highly chlorinated hydrocarbons, polyalpha-methyl styrene, alpha-methyl naphthalene, stage "B" phenolic resins, linear polyesters, acrylic resins, rosin esters, aliphatic hydrocarbon resins, mixed aromatic resins, high molecular weight polyalkylene glycols, polyvinyl alcohol and hydroxyl-containing polybutadiene. The proportion of resinous material incorporated in the sealant compositions may vary over a wide range in terms of the liquid polysulfide polymer therein. Thus the resinous material may vary from say 10% to 200% based on the weight of liquid polymer in the sealant composition.

As indicated above, the present extenders may also be advantageously used in connection with coating and adhesive compositions based on liquid curable polyepoxides. A wide variety of such epoxides is commercially available. For example, the polyepoxides with which the present extenders are used may be the normally liquid glycidyl ethers of polyhydric phenols or polyhydric alcohols. The glycidyl ethers of polyhydric phenols are commonly obtained by reacting epichlorhydrin with the desired polyhydric phenol, e.g., 2,2-bis(4-hydroxyphenyl)-propane. Other useful polyepoxides are epoxidized polyethylenically unsaturated hydrocarbons such as epoxidized 2,2'-bis(2-cyclohexenyl)-propane, epoxidized vinylcyclohexene, epoxidized dimer of cyclopentadiene, epoxidized polymers and copolymers of diolefins such as polybutadiene, butadiene-acrylonitrile copolymers, butadiene-styrene copolymers and the like.

As is known in the art, curing of the liquid polyepoxides to solid form can be effected with a variety of curing or cross-linking agents including primary, secondary and tertiary amines, such as triethylamine, ethylenediamine, diethylamine, diethylenetriamine, N-phenylenediamine, dicyandiamide and melamine and carboxylic acids or their anhydrides such as oxalic acid or phthalic anhydride. It has been found that as in the case of the compositions based on the liquid polysulfide polymers, when the present extenders are incorporated in liquid polyepoxide compositions, nearly all of the water content of the extender is in some manner bound to the polymer and does not evaporate as would be expected. Thus when the compositions based on the polyepoxide and containing the present extenders are cured in the usual manner, the water associated with the extender surprisingly remains in the compositions and little, if any, shrinkage of the cured composition occurs.

The present extenders may also be used with advantage in sealant compositions based on liquid silicone polymers. The silicone polymers used in such compositions may be curable liquid polysiloxane polymers having viscosities within the range 10,000 to about 100,000 c.p. They may be cured in known manner with metal soap curing agents, e.g., stannous octoate. When the present extenders are incorporated in such sealant compositions and the compositions are cured with conventional curing agents, nearly all of the water associated with the extender remains in the cured composition and does not evaporate therefrom. Thus, as in the case of the polysulfide and polyepoxide compositions, little, if any, shrinkage of the cured composition occurs.

The quantity of the present extenders that is added to the sealant composition depends in part on the nature of the polymer on which the sealant is based and may vary over a wide range, particularly in the case of the polysulfide sealants where a compatability promoter is desirably used. Thus the quantity of extender may vary from about 10% to about 200% of the weight of liquid polymer in the sealant composition.

In general, the compositions of the present invention are so-called "two-package" sealants, that is, the components of the sealant are separately packaged and mixed at the point of use to produce a mixture that reacts to form an elastomeric seal or coating having the desired properties. Thus in the case of the liquid sealant compositions based on liquid polysulfide polymers, the liquid polymer and curing agent therefor are packaged separately. The extender and compatibility-promoting resinous material may be included in either package, or partially in each package, but are preferably premixed with the liquid polymer with the curing agent being separately packaged. Similarly in the case of compositions based on liquid polyepoxides and polysiloxanes, the curing agent is separately packaged with the extender being included in either package or partially in each package.

In order to point out more fully the nature of the present invention, the following specific examples are given to illustrate the manner in which the present extenders can be used.

EXAMPLE 1

A curable sealant formulation was made by mixing the indicated parts by weight of the ingredients listed below:

| Component | Parts by Weight |
|---|---|
| Liquid polysulfide polymer (LP-2) | 33 |
| Coal Tar (Allied Chemical 439 – 85% CP 440 – 15%) | 33 |
| Aqueous sodium silicate (Silicate "N" - Phila. Quartz Co.) $SiO_2:Na_2O$ ratio 3.22:1, 37.6% silicate | 33 |
| Lead dioxide curing agent | 1.5 |

The liquid polysulfide polymer was of the type described above and is commercially identified as LP-2. It has an average molecular weight of about 4,000 and about 2% of cross-linking. The curing agent was a paste comprising equal parts by weight of lead dioxide and chlorinated biphenyl.

Samples of the foregoing formulation were applied to a concrete substrate and cured in air. In spite of the fact that a substantial amount of water was incorporated in the composition with the aqueous silicate, the cured compositions were homogeneous elastomeric coatings showing good adhesion to the concrete, i.e., when the coating was stripped from the substrate, failure occurred in the coating material and not at the interface between the coating and the substrate. Such failure is commonly designated "cohesive failure," as distinguished from "adhesive failure" which occurs when the coating separates at its interface with the substrate.

When heat aged at 50° C. for 300 hours, the cured formulation showed some loss in weight, but little, if any, shrinkage.

EXAMPLE 2

A curable sealant formulation having a reduced amount of the polysulfide polymer was prepared by mixing the following ingredients in the indicated parts by weight:

| Component | Parts by Weight |
|---|---|
| Liquid polysulfide polymer (LP-2) | 28.57 |
| Coal Tar (Allied Chemical 439) | 35.71 |
| Aqueous sodium silicate (Silicate "N") $SiO_2:Na_2O$ ratio 3.22:1 | 35.71 |
| Lead dioxide curing agent | 1.5 |

The adhesion to concrete and heat aging properties of the cured composition were similar to those obtained in Example 1.

EXAMPLE 3

A curable sealant formulation was prepared by mixing the following ingredients in the indicated parts by weight:

| Component | Parts by Weight |
|---|---|
| Liquid polysulfide polymer (LP-2) | 33 |
| Coal Tar (Allied Chemical 439) | 33 |
| Magnesium Oxide paste, 10% MgO in equal parts of water and ethylene glycol | 33 |
| Lead dioxide curing agent | 1.5 |

Samples of this formulation were applied to concrete substrates and cured in air for 7 days to give an elastomeric coating with little, if any, shrinkage. Good adhesion to the concrete was obtained as evidenced by the fact that the coatings exhibited cohesive failure.

EXAMPLE 4

A number of sealant formulations were prepared having the following formulation wherein various resins other than the coal tar of Examples 1 and 2 were used:

| Component | Parts by Weight |
|---|---|
| Liquid polysulfide polymer (LP-2) | 20 |
| Aqueous sodium silicate (Silicate "N") | 5 |
| Resin | 5 |
| Lead dioxide curing agent | 2.4 |

The curing agent in these formulations was a mixture of 7.5 parts of lead dioxide and 4.4 parts of liquid poly-alpha-methyl styrene. The resins used were:

1. A stage "B" phenolic resin (Methylon resin 75121, General Electric Co.),
2. A triethylene glycol ester of hydrogenated rosin (Staybelite ester "3", Hercules, Inc.),
3. A petroleum hydrocarbon resin with aliphatic characteristics (Piccopale 100, Penn. Ind. Chem. Corp.),
4. A mixed aromatic resin (piccovar-420, Penn. Ind. Chem. Corp.),
5. An acrylic resin (Acryloid AT-70), Rohm & Haas Chem. Co.),
6. A hydroxy-terminated polyester made by condensing adipic acid with a mixture of ethylene and propylene glycols (ZL-634, Thiokol Chemical Corporation),
7. A high molecular weight polyethylene glycol (Carbowax-400),
8. A hydroxyl-containing polybutadiene resin (R-45M, Arco Chem. Co.),
9. A fluorocarbon-modified polybutadiene resin,
10. Polyvinyl alcohol, and
11. A 5-carbon fluoro-alcohol.

In each case the composition cured at room temperature within one hour after mixing to a uniform tough rubber having the water associated with the aqueous silicate bound therein.

EXAMPLE 5

A sealant composition was prepared having the following formulation:

| Component | Parts by Weight |
| --- | --- |
| Liquid polysulfide polymer (LP-2) | 20 |
| Coal Tar (Allied Chemical 439) | 10 |
| Aqueous sodium silicate (Silicate "N") $SiO_2:Na_2O$ ratio 2:1, 54% silicate | 10 |
| Lead dioxide curing paste | 2.4 |

A room temperature cure to a rubber was obtained in about 1 hour.

EXAMPLE 6

Sealant compositions were made using three different types of colloidal silica dispersions in the following formulations:

| Component | Parts by Weight |
| --- | --- |
| Liquid polysulfide polymer (LP-2) | 10 |
| Coal Tar (Allied Chemical 439) | 5 |
| Silica | 5 |
| Lead dioxide curing paste | 1.2 |

The silicas used were:
1. A 50% aqueous colloidal dispersion of silica containing about 0.35% $Na_2O$ and having a pH of 9.0 (Nalcoag 1050),
2. A 50% colloidal dispersion of silica in ethylene glycol ethyl ether (Nalcoag 40D04), and
3. A 15% aqueous colloidal dispersion of silica containing about 0.80% $Na_2O$ and having a pH of 10.4 (Nalcoag D-2195).

In each case curing to a rubber occurred at room temperature within about an hour of mixing.

EXAMPLE 7

A sealant composition was prepared having the following formulation:

| Component | Parts by Weight |
| --- | --- |
| Liquid polysulfide polymer (LP-2) | 10 |
| Alpha-methyl naphthalene | 10 |
| Aqueous sodium silicate (Silicate "N") | 10 |
| Lead dioxide curing paste | 2.6 |

A good rubber cure was obtained at room temperature.

EXAMPLE 8

A sealant composition was prepared having the following formulation:

| Component | Parts by Weight |
| --- | --- |
| Liquid polysulfide polymer (LP-2) | 10 |
| Aqueous sodium silicate (Silicate "N") | 10 |
| Chlorinated biphenyl (Arochlor 1254) | 10 |
| Lead dioxide curing paste | 2.6 |

A good rubber cure was obtained at room temperature.

EXAMPLE 9

A sealant composition was prepared having the following formulation:

| Component | Parts by Weight |
| --- | --- |
| Liquid polysulfide polymer (LP-2) | 10 |
| Poly-alpha-methyl styrene (Dow 276-V2) | 10 |
| Aqueous sodium silicate (Silicate "N") | 10 |
| Zinc peroxide curing paste | 2.2 |

The zinc peroxide paste was a 50:50 mixture of zinc peroxide and chlorinated biphenyl.
A good white rubber cure was obtained.

EXAMPLE 10

A magnesium oxide paste was prepared by mixing 30 parts of finely divided MgO with 135 parts of water and 135 parts of ethylene glycol. The resulting paste was mixed with an equal weight of coal tar-439.

A curing agent was prepared by mixing equal parts of lead dioxide and coal tar-439.

20 parts of the magnesium oxide/coal tar paste were then mixed with 10 parts of liquid polysulfide polymer and 2.6 parts of the curing agent. The mixture cured at room temperature to give a rubber of good quality.

EXAMPLE 11

A magnesium oxide paste was prepared containing 17% by weight of finely divided MgO in a 50:50 mixture of ethylene glycol and water. This paste was mixed with an equal weight of aqueous sodium silicate (Silicate "N").

10 parts of the resulting silicate/magnesium oxide mixture was then mixed with 10 parts of a 75/25 mixture of coal tars CP 440 and 439 and 1.5 parts of the curing agent of Example 10. Thereafter the resulting mixture was mixed with 10 parts of liquid polysulfide polymer (LP-2).

This formulation cured at room temperature to give a rubber having good properties.

EXAMPLE 12

A master batch was prepared having the following formulation:

| Component | Parts by Weight |
| --- | --- |
| Liquid polysulfide polymer (LP-32) | 100 |
| $CaCO_3$ (Multiflex M.M.) | 25 |
| Precipitated $CaCO_3$ (Icecap K) | 30 |
| $TiO_2$ (Titanox RA 50) | 10 |
| Chlorinated biphenyl (Arochlor 1254) | 35 |

The liquid polymer LP-32 of this Example is similar to polymer LP-2, except that it has about 0.5% of cross-linking instead of 2% cross-linking.

A sealant composition was prepared incorporating a quantity of the foregoing master batch and having the following composition:

| Component | Parts by Weight |
| --- | --- |
| MgO paste (14% MgO in 50:50 mixture of ethylene glycol and water) | 10 |
| Master batch | 20 |

-continued

| Component | Parts by Weight |
|---|---|
| Lead dioxide curing paste | 1.5 |

This composition gave an exceptionally fast cure to a rubber having good properties.

EXAMPLE 13

A sealant composition was prepared having the following composition:

| Component | Parts by Weight |
|---|---|
| MgO paste (14% paste as in Ex. 12) | 10 |
| Poly-alpha-methyl styrene (Dow 276-V-2) | 10 |
| Zinc peroxide curing paste (as in Ex. 9) | 2.2 |
| Liquid polysulfide polymer (LP-2) | 10 |

The MgO paste, poly-alpha-methyl styrene and curing paste were premixed and then mixed with the polysulfide polymer. A good white, tough rubber cure was obtained.

EXAMPLE 14

A sealant composition was prepared having the following formulation:

| Component | Parts by Weight |
|---|---|
| Magnesium oxide (14% paste as in Ex. 12) | 5 |
| Aqueous sodium silicate (Silicate "N") | 5 |
| Poly-alpha-methyl styrene (Dow 276-V2) | 10 |
| Zinc peroxide curing paste (as in Ex. 9) | 2.2 |
| Liquid polysulfide polymer (LP-2) | 10 |

The components, other than the polysulfide polymer, were premixed and then mixed with the polysulfide polymer. A spongy, white cured rubber was obtained.

EXAMPLE 15

In this Example a silicone sealant material was modified with aqueous sodium silicate having an $SiO_2:Na_2O$ ratio of 3.75:1 and a solids content of about 32% by weight (Silicate S-35, Phila. Quartz Co.). A formulation was prepared having the following composition:

| Component | Parts by Weight |
|---|---|
| Sealant based on liquid polysiloxane polymer (RTV-631, Part "A", General Electric Co.) | 22.5 |
| Tin octoate curing agent (RTV-631, Part "B", General Electric Co.) | 2.5 |
| Aqueous sodium silicate, $SiO_2:Na_2O$ ratio 3.75:1, 32% solids | 7.5 |

The curing properties of the foregoing composition were compared with those of a similar composition containing no aqueous sodium silicate and it was found that while the formulation containing the aqueous silicate cured somewhat more slowly than the control formulation, it cured to a good quality of rubber similar to that of the control.

EXAMPLE 16

A composition was prepared using the silicone sealant and curing agent of Example 15, but substituting aqueous magnesium oxide containing 37% by weight magnesium oxide for the aqueous silicate of Example 15 to give the following formulation:

| Component | Parts by Weight |
|---|---|
| Sealant based on liquid polysiloxane | 22.5 |
| Tin octoate curing agent | 2.5 |
| 37% aqueous magnesium oxide | 7.5 |

Upon mixing of the components of the foregoing formulation, the mixture cured at room temperature to a somewhat spongy rubber in which the water of the aqueous magnesium oxide was bound and no trace of solid magnesium oxide could be detached.

EXAMPLE 17

A coating composition was prepared having the following formulation:

| Component | Parts by Weight |
|---|---|
| Diglycidyl ether of Bisphenol A, (EPON 828) | 20 |
| Aqueous sodium silicate (Silicate "N") | 10 |
| 2,4,6-tri-dimethylaminomethyl phenol, (DMP-30) | 2 |

The components were mixed and allowed to stand at room temperature. After standing for a few days the mixture turned into a hard mass with the water associated with the aqueous silicate bound therein.

EXAMPLE 18

A coating composition was prepared having the following formulation:

| Component | Parts by Weight |
|---|---|
| Diglycidyl ether of Bisphenol A, (EPON 828) | 10 |
| Aqueous sodium silicate (Silicate "N") | 10 |
| Liquid polysulfide polymer (LP-32) | 10 |
| 2,4,6-tri-dimethylaminomethyl phenol (DMP-30) | 2 |

The liquid polyepoxide was mixed with the aqueous sodium silicate and the liquid polysulfide polymer was mixed with the amine curing agent, after which the two mixtures were combined and allowed to stand at room temperature. After 24 to 48 hours the mixture was somewhat rubbery and easy to cut. After several days it set to a hard, plastic-appearing material having relatively good impact resistance.

EXAMPLE 19

A coating composition was prepared having the following formulation:

| Component | Parts by Weight |
|---|---|
| Diglycidyl ether of Bisphenol A, (EPON 828) | 20 |
| Aqueous sodium silicate (Silicate "N") | 11 |

-continued

| Component | Parts by Weight |
|---|---|
| 2,4,6-tri-dimethylaminomethyl phenol | 1 |

The foregoing components were mixed and cured at room temperature to yield a very hard yellow plastic.

EXAMPLE 20

A composition was prepared by mixing the following ingredients in the indicated proportions:

| Component | Parts by Weight |
|---|---|
| Liquid polysulfide polymer (LP-2) | 20 |
| Aqueous potassium silicate, $SiO_2:K_2O$ ratio 2.5:1, about 29% solids content (Kasil No. 1) | 10 |
| Lead dioxide curing agent | 2.4 |

When the foregoing components were mixed, the mixture cured rapidly at room temperature to yield a tough rubber in which the water content of the aqueous silicate was bound.

EXAMPLE 21

A composition was prepared by mixing the following ingredients in the indicated proportions:

| Component | Parts by Weight |
|---|---|
| Liquid polysulfide polymer (LP-2) | 20 |
| Aqueous potassium silicate, $SiO_2:K_2O$ ratio 2.1:1, about 39% solids content (Kasil No. 6) | 10 |
| Lead dioxide curing agent | 2.4 |

When the foregoing components were mixed, the mixture cured rapidly at room temperature to yield a rubber similar to the product of Example 20.

It is of course to be understood that the foregoing Examples are intended to be illustrative only and that numerous changes can be made in the ingredients, proportions and conditions disclosed therein without departing from the spirit of the invention as defined in the appended claims. For example, various special purpose additives such as fillers, curing rate modifiers, adhesion promoters, plasticizers and the like previously known and used in the sealant art can be added to the above formulations as desired. Other modifications within the scope of the invention will be apparent to those skilled in the art.

We claim as our invention:

1. A fluid sealant composition adapted to be converted by a curing agent to rubber-like form, said composition comprising (a) liquid mercapto-terminated polysulfide polymer as its sole organic polymer, (b) 10% to 200% by weight, based on the weight of said polymer, of aqueous alkali metal silicate containing about 20% to 60% by weight solids, and (c) from 10% to 200% by weight, based on the weight of said polysulfide polymer, of coal tar.

2. A fluid sealant composition according to claim 1 wherein said aqueous silicate is a sodium silicate.

3. A fluid sealant composition according to claim 1 wherein said aqueous silicate is a potassium silicate.

4. A fluid sealant composition adapted to be converted by a curing agent to rubber-like form, said composition comprising (a) liquid mercapto-terminated polysulfide polymer as its sole organic polymer, (b) 10% to 200% by weight, based on the weight of said polymer, of aqueous alkali metal silicate containing 20% to 60% by weight solids and having an $M_2O:SiO_2$ ratio of 1:1 to 1:4 and (c) from 10% to 200% by weight of coal tar, based on the weight of said polysulfide polymer.

5. In a process for curing a fluid sealant composition based on mercapto-terminated polysulfide polymer as its sole organic polymer to convert said fluid composition into rubber-like form, the improvement which comprises mixing with said polymer as an extender prior to curing from 10% to 200% by weight, based on the weight of said polymer, of aqueous alkali metal silicate containing about 20% to 60% by weight of solids and from 10% to 200% by weight of coal tar, based on the weight of said polysulfide polymer.

6. The cured composition of claim 1.

7. The cured composition of claim 4.

* * * * *